(12) United States Patent
Croteau

(10) Patent No.: US 6,320,924 B1
(45) Date of Patent: Nov. 20, 2001

(54) I-SPRING AND ASSOCIATED FERRULE ASSEMBLY FOR A NUCLEAR FUEL BUNDLE

(75) Inventor: Edward A. Croteau, Hartland, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 08/677,351

(22) Filed: Jul. 2, 1996

(51) Int. Cl.[7] ...................................................... G21C 3/34
(52) U.S. Cl. ............................................ 376/438; 376/462
(58) Field of Search .................................... 376/438, 439, 376/441, 442, 462

(56) References Cited

U.S. PATENT DOCUMENTS

| 5,078,961 | * | 1/1992 | Johansson et al. | 376/441 |
| 5,173,252 | * | 12/1992 | Johansson | 376/441 |
| 5,566,217 | * | 10/1996 | Croteau et al. | 376/462 |

* cited by examiner

*Primary Examiner*—Daniel Wasil
(74) *Attorney, Agent, or Firm*—Nixon & Vanderhye P.C.

(57) ABSTRACT

A sub-assembly for a spacer in a nuclear fuel bundle includes at least first and second ferrules lying adjacent one another for receiving respective nuclear fuel rods. Each ferrule has fuel rod contacting points along one side of the ferrule for abutting a fuel rod within the ferrule, and a substantially I-shaped opening along a side of the ferrule opposite the one side. A substantially I-shaped spring adapted to seat within the opening includes a spring body lying in a plane and having opposite horizontal end portions connected by a vertical stem portion, a central portion of each of the horizontal end portions projecting away from the substantially I-shaped opening to one side of the plane and a center portion of the vertical stem projecting into the substantially I-shaped opening to an opposite side of the plane. The spring is adapted to be disposed between the adjacent ferrules with the vertical stem seated in the opening of the first ferrule with the center portion of the stem adapted to bear against the fuel rod within the first ferrule and maintaining the fuel rod against the fuel rod contacting points of the first ferrule. The horizontal end portions lie with the central portions of each end portion bearing directly against the second ferrule circumferentially between a pair of the fuel rod contacting points of the second ferrule.

10 Claims, 5 Drawing Sheets

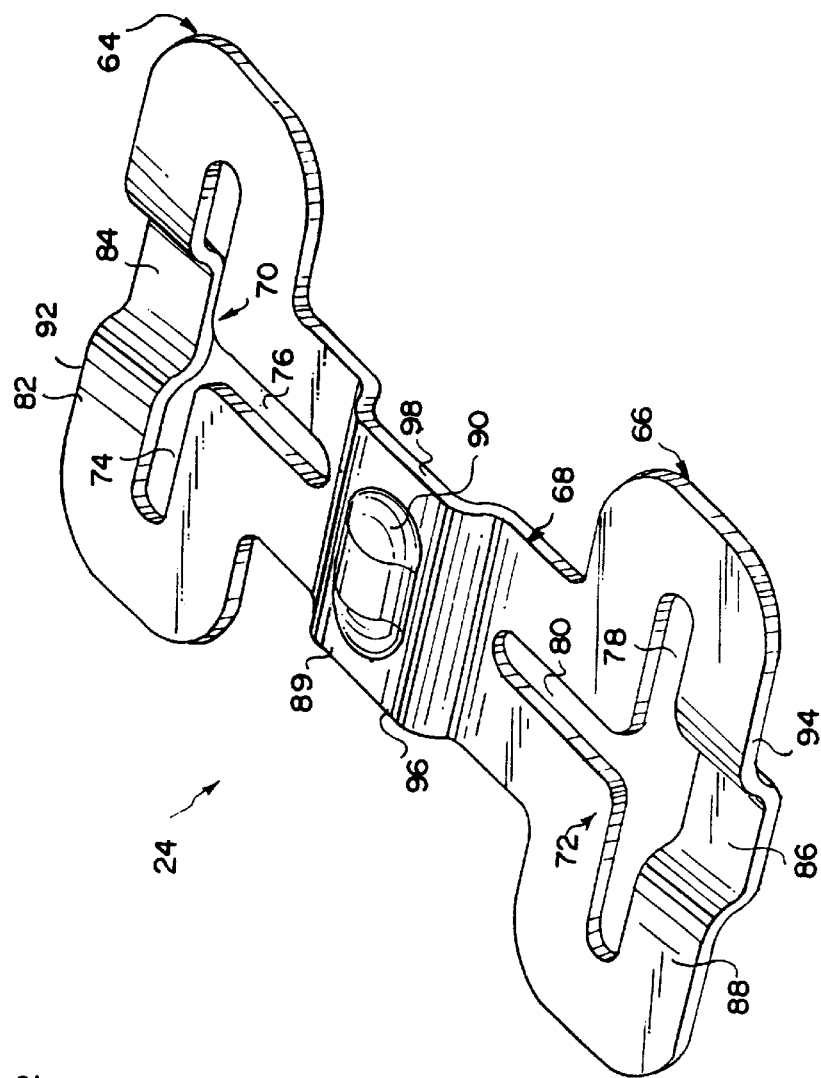
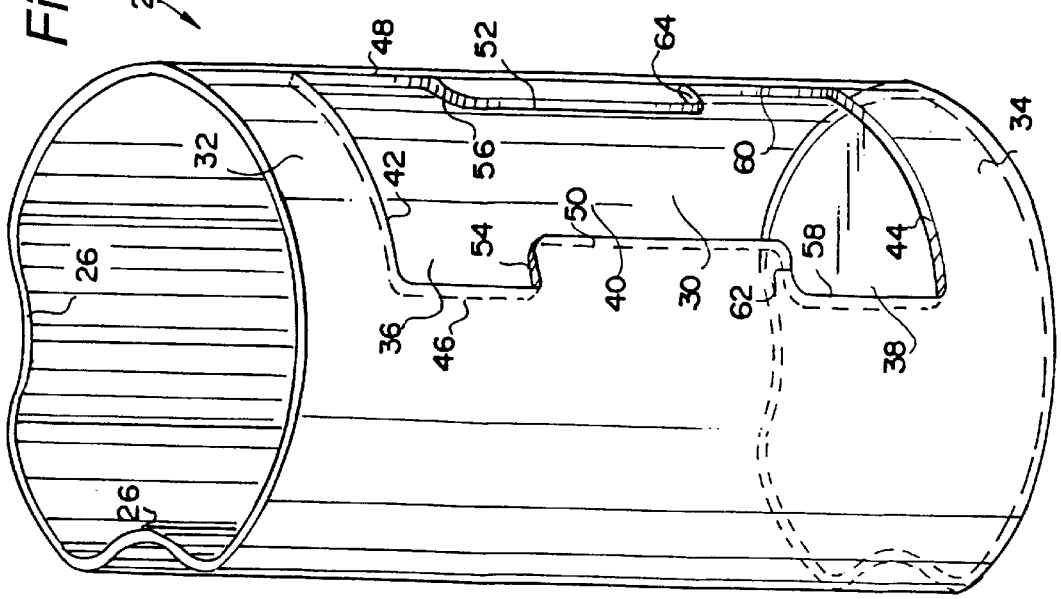

I-SPRING AND ASSOCIATED FERRULE ASSEMBLY FOR A NUCLEAR FUEL BUNDLE

TECHNICAL FIELD

The present invention relates to a spacer for nuclear fuel rods and particularly to a unique, substantially I-shaped spring and associated ferrule assembly for the fuel rod spacer.

BACKGROUND

In a nuclear reactor, for example a boiling water reactor, nuclear fuel rods are grouped together in an open-ended tubular flow channel, typically referred to as a fuel assembly or bundle. A plurality of fuel assemblies are positioned in the reactor core in a matrix and a coolant/moderator flows upwardly about the fuel rods for generating steam. In each assembly or bundle, fuel rods are supported between upper and lower tie plates in side-by-side parallel arrays. Spacers are employed at predetermined elevations along each fuel bundle to restrain the fuel rods from bowing or vibrating during reactor operation, and to protect the fuel rod assembly during possible loading events, such as handling and shipping.

Typical spacers often include a plurality of ferrules arranged in side-by-side relation and secured by, for example, welding to one another to form the support matrix of the spacer. A single fuel rod passes through each generally cylindrically shaped ferrule. The ferrules include circumferentially spaced, axially extending interior protuberances (or hard stops) and spring assemblies seated in openings formed in opposite sides of the ferrule from the protuberances, for centering and biasing the fuel rods against the hard stops, thereby maintaining the fuel rods in fixed relation one to the other across the spacer. The spacer itself constitutes an obstacle to bundle performance in that its cross-section interferes with the flow of water/moderator through the bundle. An ideal spacer would have minimal impact on bundle performance (thermal hydraulics, critical power), while still restraining the rods in their intended positions and protecting them. Consequently, an optimum fuel bundle spacer should have as little cross-section as possible, use a minimum amount of material and simultaneously meet structural requirements for positioning and protecting the fuel rods.

In developing new spacer spring designs for denser bundle matrices (for example, 8×8, 9×9, and 10×10), one challenge is to design the spring so that it will be sufficiently flexible to maintain historical preload limits as the space between the fuel rods becomes smaller (i.e., the spring deflection increases as the space decreases). Since it has been determined that the accelerated dead weight of the fuel rods at the. spacer locations damages the springs, a second challenge is to design the spring such that assembled fuel bundles can be shipped without the aid of plastic inserts to carry the weight of the rods as they travel on trucks. The damage mentioned above occurs because current spacer designs involve one spring being shared between two adjacent fuel rods, and this type of arrangement means that some fuel rods are sitting on the springs when the bundle is laid horizontally on the truck bed, causing the rod's own dead weight to be accelerated directly into the spring underneath it. Some prior spacer designs which include ferrules with one spring per two adjacent fuel rods are disclosed in commonly owned U.S. Pat. Nos. 5,173,252 and 5,078,961.

In commonly owned application Ser. Nos. 08/380,591 filed Jan. 30, 1995 and 08/516,203 filed Aug. 17, 1995, spring designs are disclosed which are based on a one spring per fuel rod criteria, with the ability to ship without conventional plastic inserts. However, a disadvantage of these spring designs is that too much spring material protrudes into the subchannel regions between the ferrules, and their respective geometries are thought to be susceptible to self-vibration due to coolant water flow across the springs.

DISCLOSURE OF THE INVENTION

The spring design for ferrule spacers in accordance with this invention do not require plastic insert supports for the spacers during shipping. The individual springs and ferrules are simply aligned within the fixture (before welding), with the associated springs all oriented in a single chosen direction, such that the shipping loads, which occur during bundle shipment to customers, can be taken up by the hard stops on the ferrules and not by the springs themselves.

In addition, the springs in accordance with this invention have the required flexibility but with minimal projection into the subchannels. More specifically, the spring is given generally the shape of an "I", so that only the lateral ends or ears of the spring protrude into the subchannel, with the majority of the spring geometry captured in a cutout formed in the ferrule.

In the exemplary embodiment, the ferrule is substantially cylindrical, but with a pair of axially extending grooves or indents which provide a pair of hard stops on the interior of the ferrule when the fuel rod is inserted within the spacer. In the arcuate wail of the ferrule, opposite the pair of hard stops, there is a generally "I" shaped cutout or opening, also extending axially of the ferrule. Thus, the opening has a pair of relatively wider cutout portions connected by an axially extending narrower portion.

The I-shaped spring in accordance with an exemplary embodiment of the invention also includes upper and lower wider portions, or flanges connected by a stem. Each flange is formed with a centrally located outward (away from the ferrule) projection, while the center portion of the narrower stem which connects the flanges is formed with an inward (toward the ferrule) projection. This inwardly directed projection is also provided with an inwardly extending dimple which is adapted to engage a fuel rod placed within the ferrule. The spring in accordance with the exemplary embodiment of the invention is also form ed with a pair of "T" shaped cutouts, one upright and one inverted, located on either side of the inward projection on the spring stem.

When the spring is aligned within the "I" shaped opening of the ferrule, only the upper and lower flanges of the spring protrude from the ferrule and extend into the subchannel regions. The remaining portion of the spring including the entire stem portion is substantially located within the ferrule cut-out. This new design concept significantly reduces the amount of spring material that protrudes into the coolant flow, and the geometry is such that the spring is captured more securely within the ferrule cutout to thereby guard against spring movement due to flow-induced vibration. This is in sharp contrast to previous designs which have significant areas of the spring geometry within the subchannel flow, making the springs susceptible to movement from the force of the water impacting on the spring.

Thus, in accordance with the exemplary embodiment of the invention, there is provided a sub-assembly for a spacer useful in a nuclear fuel bundle for maintaining a matrix of a plurality of nuclear fuel rods passing through the spacer in spaced-apart relation, comprising at least first and second ferrules lying adjacent one another for receiving respective nuclear fuel rods, each ferrule having fuel rod contacting points along one side of the ferrule for abutting a fuel rod within the ferrule and a substantially I-shaped opening along a side of the ferrule opposite the one side; a substantially I-shaped spring including a spring body lying in a plane and having opposite horizontal end portions connected by a vertical stem portion, a central portion of each horizontal end portions projecting away from the substantially I-shaped opening to one side of the plane and a center portion of the vertical stem projecting into the substantially I-shaped opening to an opposite side of the plane; the spring being disposed between said adjacent ferrules with the vertical stem seated in the opening of the first ferrule with the center portion of the stem adapted to bear against the fuel rod within the first ferrule and maintaining the fuel rod against the fuel rod contacting points of the first ferrule, the horizontal end portions lying substantially outside said I-shaped opening with the central portions of each end portion bearing directly against the second ferrule circumferentially between a pair of the fuel rod contacting points of the second ferrule.

In another aspect, the present invention provides a spacer for maintaining a matrix of rods in spaced apart relation between upper and lower tie plates, the spacer assembly comprising a matrix of adjacent ferrules for receiving respective fuel rods: each ferrule having fuel rod contacting points along one side of the ferrule for abutting a fuel rod within the ferrule and a substantially I-shaped opening along a side of the ferrule opposite the one side; and a substantially I-shaped spring including a spring body lying in a plane and having opposite horizontal end portions connected by a vertical stem portion, a central portion of each of the horizontal end portions projecting away from the substantially I-shaped opening to one side of the plane and a center portion of the vertical stem projecting into the substantially I-shaped opening to an opposite side of the plane, the opening being disposed between the adjacent ferrules with the vertical stem seated in the opening of the first ferrule, with the center portion of the stem adapted to bear against the fuel rod within the first ferrule and maintaining the fuel rod against the fuel rod contacting points of the first ferrule, the horizontal end portions substantially outside the I-shaped opening with the central portions of each end portion bearing directly against the second ferrule circumferentially between a pair of the fuel rod contacting points of the second ferrule.

The invention thus provides a spring and ferrule assembly where the spring has the required flexibility but with minimal projection into the subchannels between ferrules, and which provides the ability to ship fuel bundles without supports for the spacers. Other objects and advantages of the subject invention will become apparent from the detailed description which follows.

BRIEF DESCRIPTION OF THE DRAWINGS

FIG. 2 is a perspective view of a ferrule for use with the spring shown in FIG. 3;

FIG. 3 is a perspective view of an I spring for use with a ferrule in accordance with an exemplary embodiment of the invention;

BEST MODE FOR CARRYING OUT THE INVENTION

Figure 1:
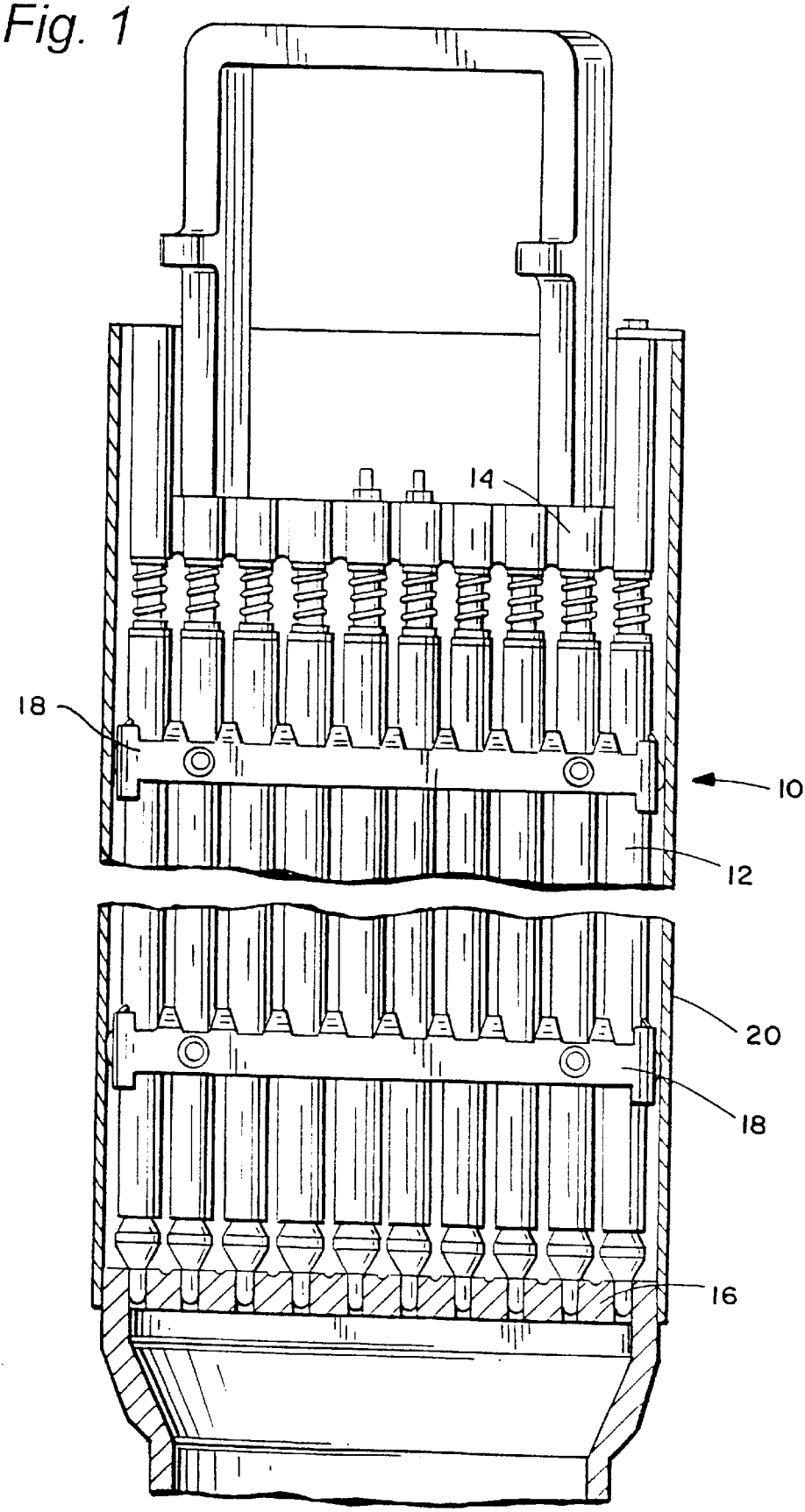
FIG. 1 is a partial side elevational view of a nuclear fuel bundle with portions broken out and in cross section for ease of illustration.
Figure 6:
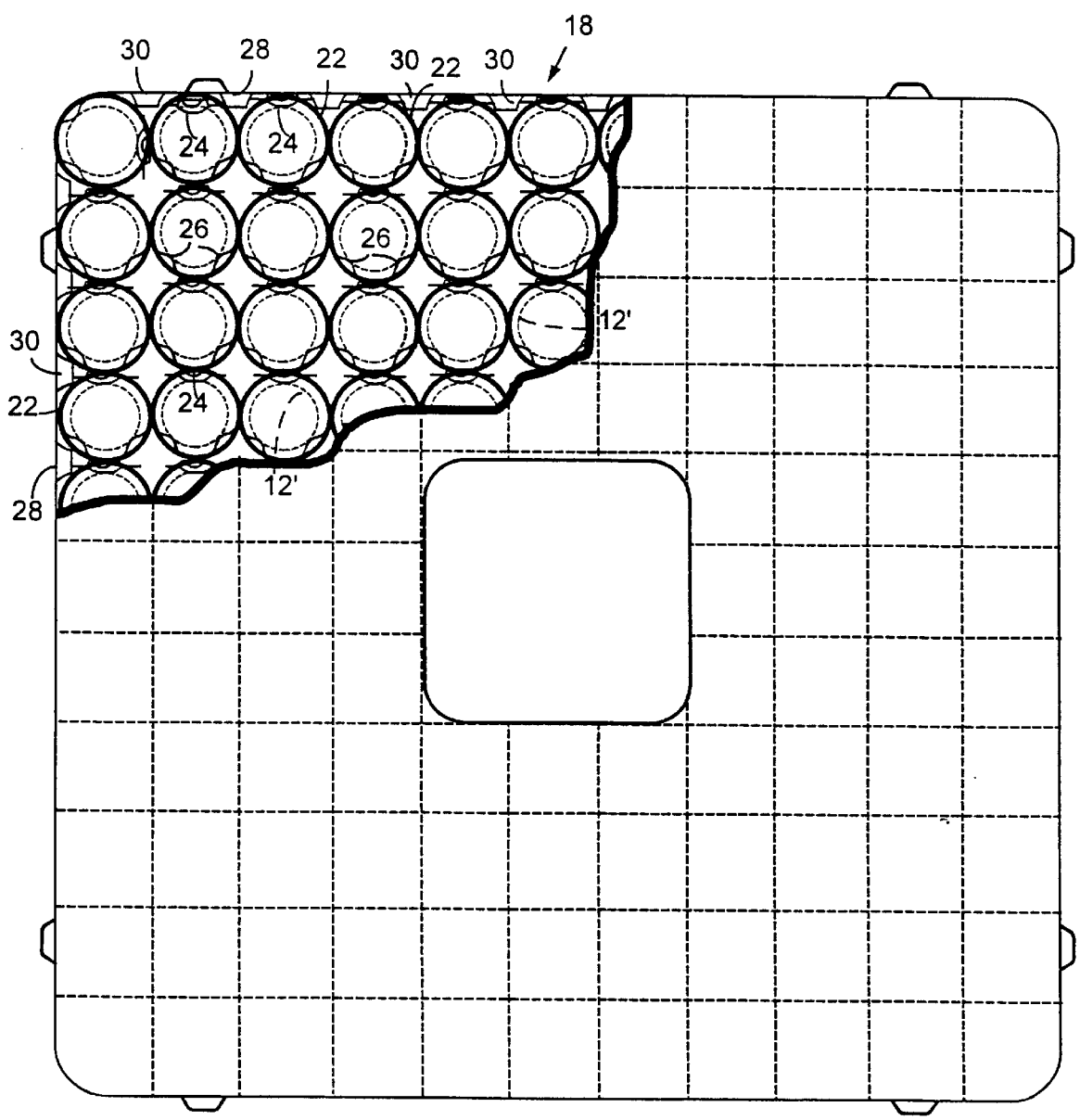
FIG. 6 is a plan view of a spacer showing the ferrule and spring assemblies of the present invention, but with portions broken out for ease of illustration.

Referring now to FIG. 1, there is illustrated a nuclear fuel bundle assembly, generally designated 10, including a plurality of fuel rods 12 supported between upper tie plate 14 and a lower tie plate 16. Fuel rods 12 pass through a plurality of fuel rod spacers 18 at vertically spaced positions along the fuel bundle. The spacers 18 provide intermediate support to retain the elongated fuel rods 12 in spaced relation relative to one another and to restrain the fuel rods from lateral vibration. With reference to FIG. 1, a 10×10 array of fuel rods is illustrated, while FIG. 6 illustrates an 11×11 array. It will be appreciated, however, that the invention hereof is applicable to various arrays of fuel rods of different numbers, for example, 8×8, 9×9, etc.

Each fuel rod 18 is formed of an elongated tubular cladding material, with the nuclear fuel and other materials sealed in the tube by end plugs. The lower end plugs register in bores formed in the lower tie plate 16, while the upper end plugs are disposed in cavities in the upper tie plate 14. Additionally, the fuel rod assembly includes a channel 20 of substantially square cross section, sized to form a sliding fit over the upper and lower tie plates and the spacers, so that the nuclear fuel bundle, including the channel 20, tie plates 14, 16, rods 12 and spacers 18 can be removed from the reactor core (not shown).

Figure 7:
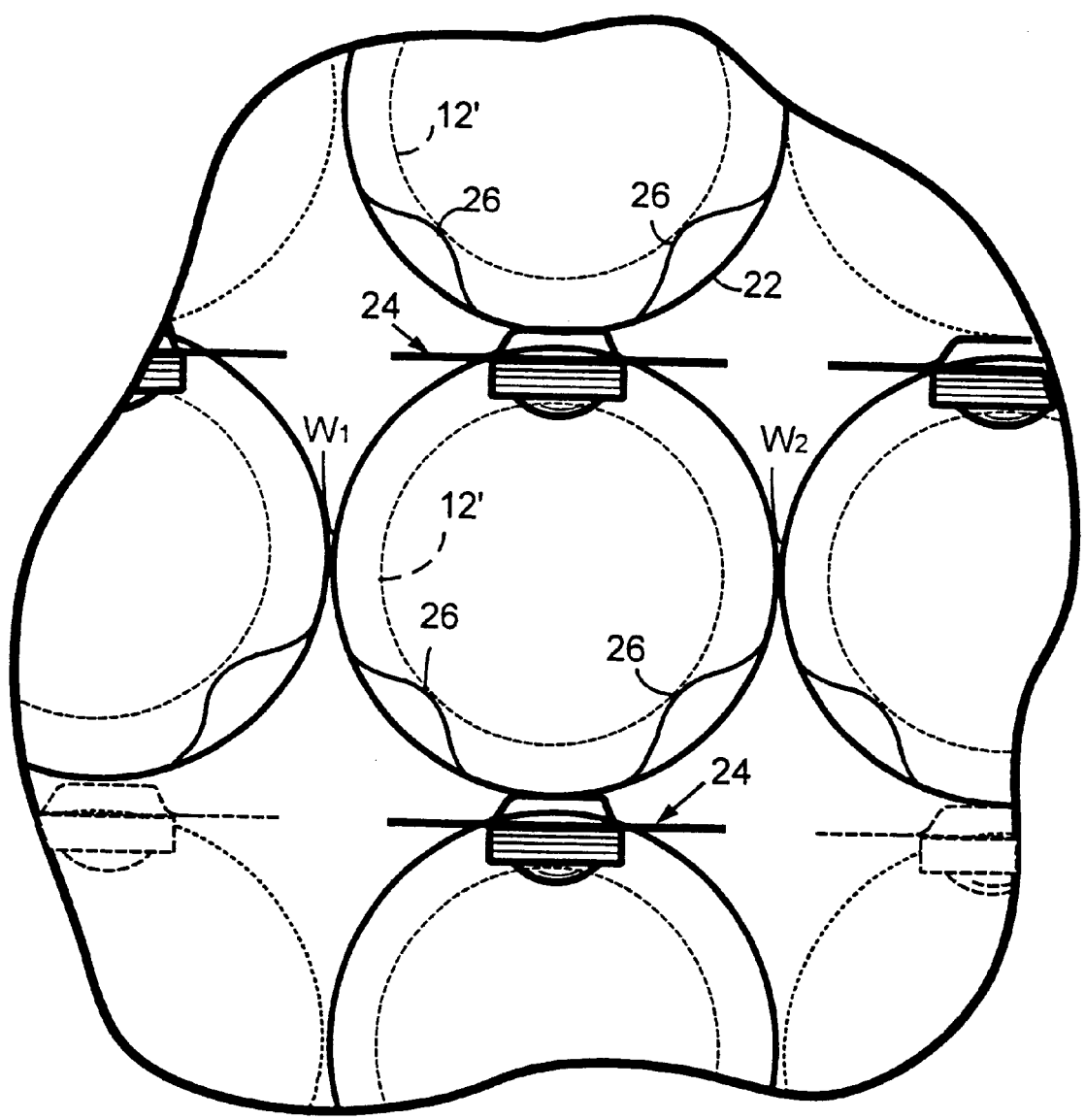
FIG. 7 is an enlarged detail of a set of ferrules taken from FIG. 6.

Turning now briefly to FIGS. 6 and 7, there is illustrated a spacer 18 constructed in accordance with the present invention, and having a plurality of individual ferrules 22 and springs 24, each ferrule 22 having a single associated spring 24, which bears against a single fuel rod 12' in a respective ferrule. The ferrules 22 are arranged in a square matrix in which each ferrule receives a fuel rod 12' and maintains the fuel rods spaced and restrained relative to adjoining fuel rods. The spring 24 of each ferrule biases its associated fuel rod in a lateral direction against hard stops 26 opposite the spring, whereby each fuel rod 12' is maintained in a predetermined position relative to one another and within the marginal band 28 of the spacer 18. The marginal band 28 normally includes inwardly directed flow tabs 30, but the latter form no part of this invention.

With reference back to FIG. 2, each spacer ferrule 22 has a generally hollow, generally cylindrical configuration. The wall of each cylindrical ferrule is indented at circumferentially spaced locations along one side of the ferrule to form the inwardly directed, axially extending hard stops 26. It will be appreciated that the stops 26 extend the full height of the ferrule, although the stops could be provided at axially spaced locations along the height of the ferrule. As best illustrated in FIG. 2, each ferrule 22 includes a central spring opening 30 opposite the hard stops 26. Spring opening 30 is defined partially by upper and lower circumferential bands 32, 34. Between these two bands, the opening 30 is centrally located and has a substantially "I" shape which includes relatively wider upper and lower portions 36, 38 connected by a narrower axially extending stem portion 40. The opening 30 is more specifically formed by upper and lower horizontal edges 42, 44, upper vertical edges 46, 48 which are connected to the vertical stem edges 50 and 52 by means of horizontal steps or shoulders 54, 56. Similarly, lower vertical edges 58 and 60 are connected to the vertical stem edges 50 and 52 by step or shoulder surfaces 62, 64. As already noted above, the opening 30 is directly opposite and centered relative to the hard stops 26.

FIG. 3 illustrates the spring 24 in detail. The spring also has a substantially "I" shape which includes, generally, a planar body including upper and lower horizontal flanges 64, 66, respectively, interconnected by a vertical stem 68. The spring 24 also includes a pair of T-shaped cutouts, one of which is upright and located in the upper half of the spring, while the other is inverted and located in the lower half of the spring. Thus, the upper cutout 70 includes a horizontal portion 74 and a vertical portion 76 whereas the lower cutout 72 includes a horizontal portion 78 and a vertical portion 80. These openings increase the flexibility and resilience of the spring 24 as will be appreciated by those of ordinary skill in the art.

The spring 24 is substantially planar except as noted below. In the upper half of the spring, the horizontal band 82 lying adjacent the horizontal portion 74 of the opening 70 is formed to include a radially outward tab or projection 84 in substantially axial or vertical alignment with the vertical portion 76 of the T-shaped cutout 70. A similar radially outwardly extending projection 86 is formed in the lower band 88 lying adjacent the horizontal portion 78 of the T-shaped cutout 72. Both projections 84 and 86 extend outwardly to substantially the same degree. In the center of the stem portion of the spring, between the vertical portions 76, 80 of the T-shaped cutouts 70, 72, respectively, there is formed a radially inwardly directed projection 89 which is further formed to include a radially inwardly extending dimple 90 which is designed to engage a fuel rod in the associated ferrule 22.

Figure 5:
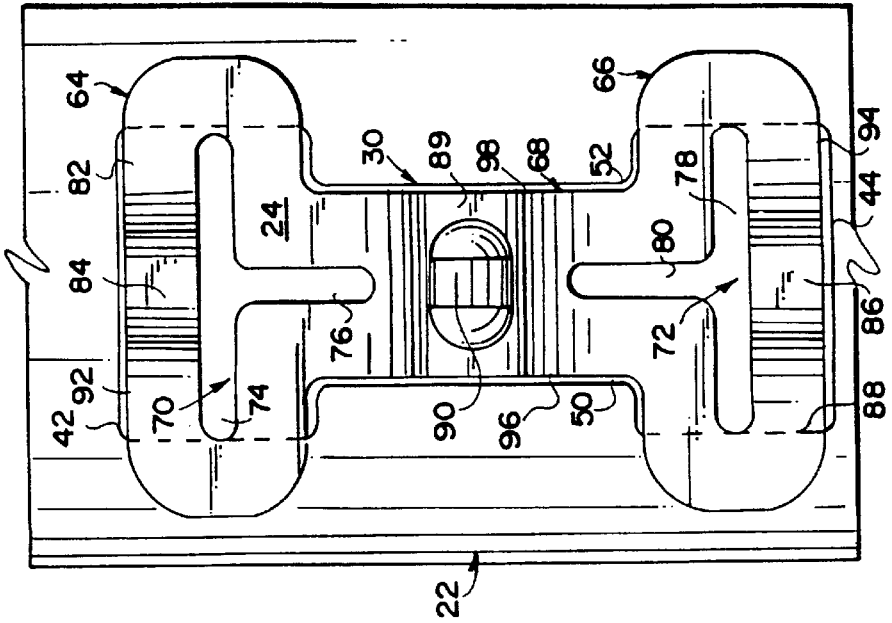
FIG. 5 is a front view of the assembly shown in FIG. 4.
Figure 4:
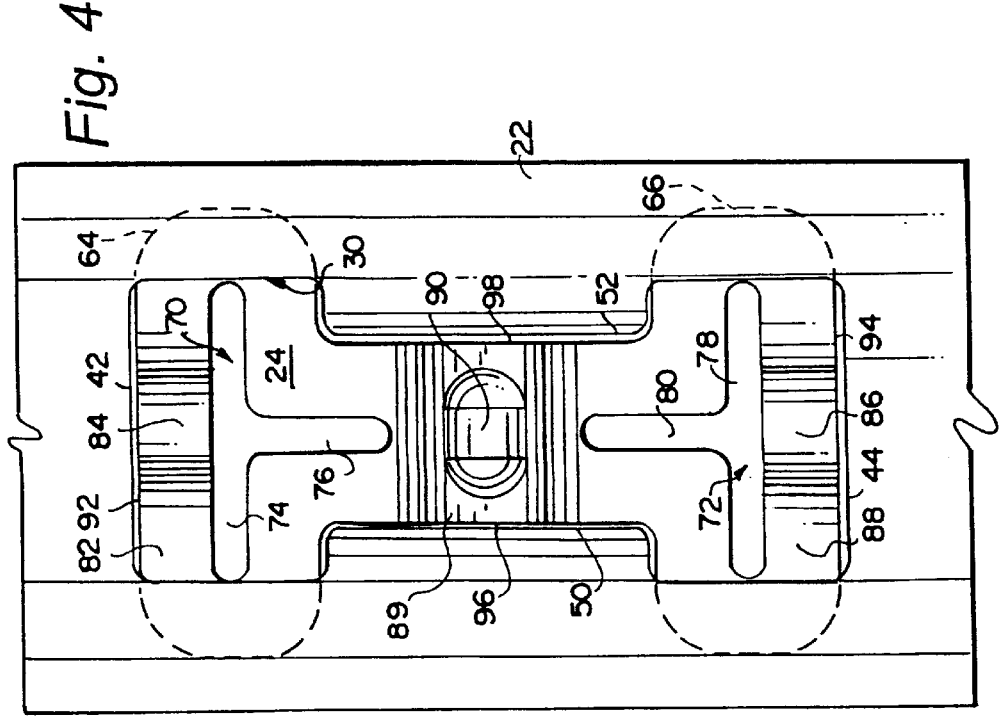
FIG. 4 is a rear view of the spring of FIG. 2 aligned within a cutout of the ferrule of FIG. 3.

With further reference now also to FIGS. 4 and 5, the spring 24 may be aligned and seated within the opening 30 such that the projection 88 and dimple 90 extend radially inwardly into the interior space of the ferrule 22, but the upper and lower flanges 64 and 66 remain on the outside of the ferrule 22. The size of the opening 30 is designed so that the spring 24 is relatively snugly received in the opening, with upper and lower edges 92, 94, respectively, supported by upper and lower edges 42, 44, respectively, of the opening 30. At the same time, vertical edges 96, 98 of the projection 88 are supported by the edges 50, 52 of the opening 30. In this way, both vertical and lateral movement of the spring 24 relative to the ferrule opening 30 is substantially precluded. It will also be noted that the movement of the spring 24 toward or away from the fuel rod 100 is limited by the edges 46, 48, 58 and 60 of the opening 30. Limiting the spring's freedom of movement is achievable because both the ferrule opening shape and the spring shape are formed by stamping, which is a reliable manufacturing process for dimensional stability.

Typically, when the spacer ferrules 22 are placed within the spacer band prior to welding, the ferrules 22 are aligned as shown in FIG. 6 with all of the hard stops 26 and spring openings 30 similarly aligned. During placement of the ferrules, the springs 24 are located within the respective openings 30 and the ferrules 22 are then welded together at diametrically opposed locations between the hard stops 26 and the opening 30. These welds are shown in FIG. 7 by letter designations $W_1$ and $W_2$, with the understanding that all of the ferrules are welded in a similar manner.

It will be appreciated that when a fuel rod 12' is inserted within the ferrule 22, the rod 12' contacts the hard stops 26 and the dimple 90. In this regard, FIG. 7 illustrates the fuel rod 12' in phantom while the spring 24 is shown in its relaxed position. In this way, it is to be understood that when the fuel rod is inserted within the ferrule, the dimple 19 and indeed the entire vertical stem of the "I" spring will be flexed radially outwardly to accommodate the rod, with the resulting bias of the fuel rod 12' against the hard stops 26.

With all of the springs and ferrules similarly aligned as shown in FIGS. 6 and 7, the bundles can be oriented horizontally for shipment in such a way that any loads which occur during bundle shipment to customers are taken by the hard stops 26 on the ferrules and not by the springs. In addition, the unique "I" shape of the springs 24 in accordance with this invention, results in only a minimal protrusion of material into the subchannel flow. This, in combination with the tight capture of the spring within the ferrule cutout, securely holds the spring against the water induced movement that could otherwise cause wear.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A sub-assembly for a spacer useful in a nuclear fuel bundle for maintaining a matrix of a plurality of nuclear fuel rods passing through the spacer in spaced-apart relation, comprising at least first and second ferrules lying adjacent one another for receiving respective nuclear fuel rods, each ferrule having fuel rod contacting points along one side of the ferrule for abutting a fuel rod within the ferrule, and a substantially I-shaped opening along a side of the ferrule opposite said one side; and a substantially I-shaped spring including a spring body lying in a plane and having opposite horizontal end portions connected by a vertical stem portion, a central portion of each of said horizontal end portions projecting away from said substantially I-shaped opening to one side of said plane and a center portion of said vertical stem projecting into said substantially I-shaped opening to an opposite side of said plane, the spring being disposed between the adjacent ferrules with said vertical stem seated in said opening of said first ferrule with the center portion of the stem adapted to bear against the fuel rod within said first ferrule and maintaining the fuel rod against the fuel rod contacting points of said first ferrule, said horizontal end portions lying with the central portions of each end portion bearing directly against said second ferrule circumferentially between a pair of said fuel rod contacting points of said second ferrule.

2. A sub-assembly according to claim 1 wherein said central portion of said spring has a dimple projecting therefrom for engaging the fuel rod within said first ferrule.

3. A sub-assembly according to claim 1 wherein said contacting points comprise indentations along the sides of the ferrules extending the full axial length of the ferrules.

4. The sub-assembly according to claim 1 wherein, within said sub-assembly, said first and second ferrules are similarly oriented.

5. The sub-assembly according to claim 1 wherein each of said first and second ferrules are substantially cylindrical in shape, and wherein said fuel rod contacting points comprise a pair of axial grooves in said ferrule, forming internal, circumferentially spaced, axially extending stops projecting into said ferrules.

6. The sub-assembly of claim 1 wherein said spring includes a pair of T-shaped cutouts, one inverted relative to the other.

7. The sub-assembly of claim 6 wherein said central portions of said horizontal end portions border on respective horizontal portions of said T-shaped cutouts.

8. The sub-assembly of claim 1 wherein said center portion of said vertical stem lies between and adjacent respective vertical portions of said T-shaped cutouts.

9. A spacer for maintaining a matrix of rods in spaced apart relation between upper and lower tie plates, said spacer assembly comprising:

a peripheral band;

a matrix of adjacent ferrules arranged within said band for receiving respective fuel rods;

each ferrule having fuel rod contacting points along one side of the ferrule for abutting a fuel rod within the ferrule and a substantially I-shaped opening along a side of the ferrule opposite said one side; and a substantially I-shaped spring including a spring body lying in a plane and having opposite horizontal end portions connected by a vertical stem portion, a central portion of each of said horizontal end portions projecting away from said substantially I-shaped opening to one side of said plane and a center portion of said vertical stem projecting into said substantially I-shaped opening to an opposite side of said plane, said opening being disposed between said adjacent ferrules with said vertical stem seated in said opening of said first ferrule, with the center portion of the stem adapted to bear against the fuel rod within said first ferrule and maintaining the fuel rod against the fuel rod contacting points of aid first ferrule, said horizontal end portions substantially outside said I-shaped opening with the central portions of each end portion bearing directly against said second ferrule circumferentially between a pair of said fuel rod contacting points of said second ferrule.

10. The spacer of claim 9 wherein all of said ferrules are similarly oriented relative to each other and to said band.

* * * * *